8264X
L. V. BADGER & R. WALKER.
WINDLASS.
Patented June 17, 1834.
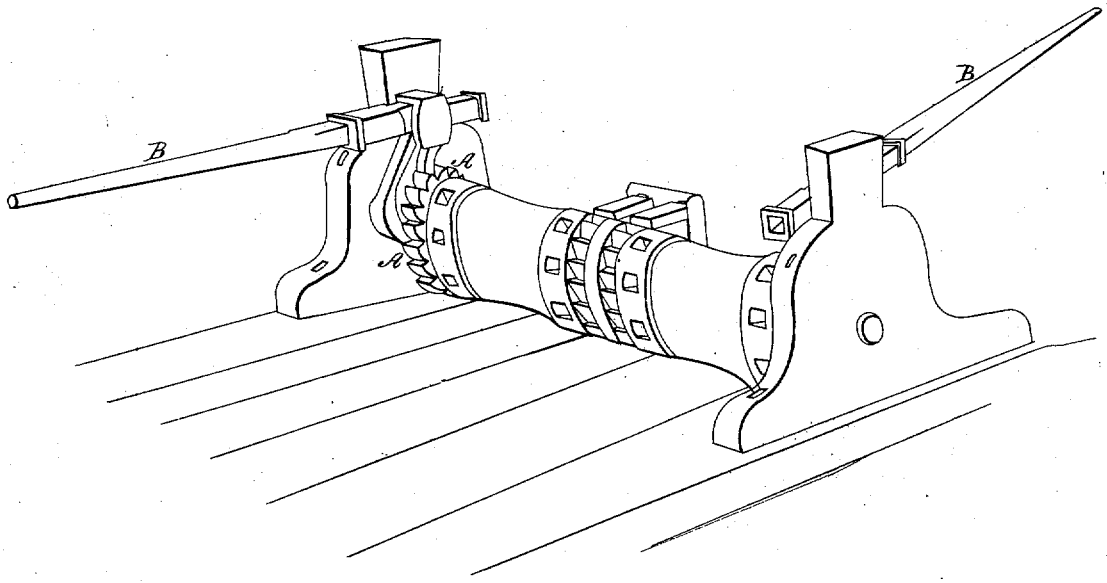
THE NORRIS PETERS CO., PHOTO-LITHO., WASHINGTON, D. C.

8264X

Leonidas V. Badger & Richard Walker, Portsmouth N. H.

Letters Patent

The Schedule referred to in these Letters Patent and making part of the same containing a description in the words of the said L. V. Badger and Richard Walker themselves of their improvement in the Windlasses.

To all to whom these presents shall come. Be it Known that We Richard Walker and L. V. Badger of Portsmouth in the County of Rockingham and State of New Hampshire have invented a new and useful improvement in the Construction of a Ships Windlass and in the application of the same to Ships and Smaller Vessels Our improvement consists in applying a double lever purchase as represented in the accompanying model and drawing, with a ratchet wheel, the size of the wheel may be varied. For a Ship, should be about thirty inches diameter, three inches thick, with teeth one and a half inch by three quarters of an inch, the levers are placed above the wheel with double falls – is operated similar to a common pump, and gives constant motion to the windlass, thereby saving half the time of any other plan heretofore adopted for similar purposes. It is not only useful for Ships windlasses for raising anchors, but may be applied to any other purposes where great power is wanted and a saving of time made.

What we claim as our invention, is the application of the above form of power to Ships windlasses for raising anchors &c.

In testimony that the above is a true Specification of our said improvement as above described we have hereunto set our hands and seals, this twenty fourth day of March in the Year of our Lord One thousand Eight Hundred and thirty four.

Witness
J. L. Badger
W. H. Y. Hackett

Leonidas V. Badger
Richard Walker

Drawing (324 Words) (Patented 17 June 1834)